United States Patent
Yamazaki

(10) Patent No.: US 9,674,882 B2
(45) Date of Patent: Jun. 6, 2017

(54) MOBILE COMMUNICATION SYSTEM, USER TERMINAL, BASE STATION, PROCESSOR, AND COMMUNICATION CONTROL METHOD

(71) Applicant: KYOCERA CORPORATION, Kyoto (JP)

(72) Inventor: Chiharu Yamazaki, Ota-ku (JP)

(73) Assignee: KYOCERA Corporation, Kyoto (JP)

( * ) Notice: Subject to any disclaimer, the term of this patent is extended or adjusted under 35 U.S.C. 154(b) by 73 days.

(21) Appl. No.: 14/437,241

(22) PCT Filed: Oct. 16, 2013

(86) PCT No.: PCT/JP2013/078040
§ 371 (c)(1),
(2) Date: Apr. 21, 2015

(87) PCT Pub. No.: WO2014/065167
PCT Pub. Date: May 1, 2014

(65) Prior Publication Data
US 2015/0282232 A1    Oct. 1, 2015

Related U.S. Application Data

(60) Provisional application No. 61/718,869, filed on Oct. 26, 2012.

(51) Int. Cl.
*H04W 4/00* (2009.01)
*H04W 76/02* (2009.01)
(Continued)

(52) U.S. Cl.
CPC ......... *H04W 76/023* (2013.01); *H04W 40/02* (2013.01); *H04W 76/043* (2013.01); *H04W 92/18* (2013.01)

(58) Field of Classification Search
CPC .......................... H04W 76/048; H04W 76/023
(Continued)

(56) References Cited

U.S. PATENT DOCUMENTS

| | | | | |
|---|---|---|---|---|
| 2013/0242866 A1* | 9/2013 | Lin | ..................... | H04W 76/023 370/328 |
| 2014/0031028 A1* | 1/2014 | Yamada | ............. | H04W 76/023 455/419 |
| 2014/0153390 A1* | 6/2014 | Ishii | ..................... | H04W 76/023 370/230 |

FOREIGN PATENT DOCUMENTS

| | | |
|---|---|---|
| EP | 2903390 A1 | 8/2015 |
| JP | 2004-023613 A | 1/2004 |

OTHER PUBLICATIONS

The extended European search report issued by the European Patent Office on Jul. 1, 2016, which corresponds to European Patent Application No. 13849821.7-1505 and is related to U.S. Appl. No. 14/437,241.
(Continued)

*Primary Examiner* — Iqbal Zaidi
(74) *Attorney, Agent, or Firm* — Studebaker & Brackett PC

(57) ABSTRACT

A mobile communication system including a base station, a first user terminal and a second user terminal that establish a connection with the base station, and a core network that accommodates the base station, supports cellular communication in which a data path set between the first user terminal and the second user terminal passes through the core network and D2D communication in which the data path does not pass through the core network. The D2D communication includes a first D2D communication mode in which the data path does not pass through the base station and a second D2D communication mode in which the data path passes through the base station. When a communication state of the
(Continued)

D2D communication in the first D2D communication mode has been deteriorated, the first user terminal and the second user terminal make a transition to the second D2D communication mode to transmit non-transmitted data and then switch the D2D communication to the cellular communication.

13 Claims, 11 Drawing Sheets

(51) Int. Cl.
    *H04W 40/02*     (2009.01)
    *H04W 76/04*     (2009.01)
    *H04W 92/18*     (2009.01)

(58) Field of Classification Search
    USPC ................................. 370/230–339; 455/419
    See application file for complete search history.

(56) References Cited

OTHER PUBLICATIONS

International Search Report; PCT/JP2013/078040; Dec. 24, 2013.
3GPP TR 22.803 V0.3.0 (May 2012); 3rd Generation Partnership Project; Technical Specification Group SA; Feasibility Study for Proximity Services (ProSe)(Release 12).
JP Office Action dated Nov. 8, 2016 from corresponding JP Appl No. 2015-236182 with concise statement of relevance, 4 pp.

\* cited by examiner

CELLULAR COMMUNICATION

MOBILE COMMUNICATION SYSTEM, USER TERMINAL, BASE STATION, PROCESSOR, AND COMMUNICATION CONTROL METHOD

TECHNICAL FIELD

The present invention relates to a mobile communication system that supports D2D communication, a user terminal, a base station, a processor and a communication system in the mobile communication system.

BACKGROUND ART

In a 3GPP (3rd Generation Partnership Project) which is a project aiming to standardize a mobile communication system, the introduction of Device to Device (D2D) communication is discussed as a new function after Release 12 (see non patent document 1).

In the D2D communication, a plurality of adjacent user terminals perform communication in a frequency band assigned to the mobile communication system without a core network. It is noted that the D2D communication is also called Proximity Service communication.

PRIOR ART DOCUMENT

Non-Patent Document

Non Patent Document 1: 3GPP technical report "TR 22.803 V0.3.0" May 2012.

SUMMARY OF THE INVENTION

In the current state, there is no designed specification for appropriately controlling D2D communication.

Therefore, the present invention provides a mobile communication system capable of appropriately controlling D2D communication, a user terminal, a base station, a processor and a communication system in the mobile communication system.

According to one embodiment, a mobile communication system includes a base station, a first user terminal and a second user terminal that establish a connection with the base station, and a core network that accommodates the base station. The mobile communication system supports cellular communication in which a data path set between the first user terminal and the second user terminal passes through the core network and D2D communication in which the data path does not pass through the core network. The D2 D communication includes a first D2D communication mode in which the data path does not pass through the base station and a second D2D communication mode in which the data path passes through the base station. The first user terminal and the second user terminal make a transition to the second D2D communication mode to transmit non-transmitted data When a communication state of the D2D communication in the first D2D communication mode has been deteriorated and then switch the D2D communication to the cellular communication.

DESCRIPTION OF THE EMBODIMENT

Overview of Embodiment

Figure 1:
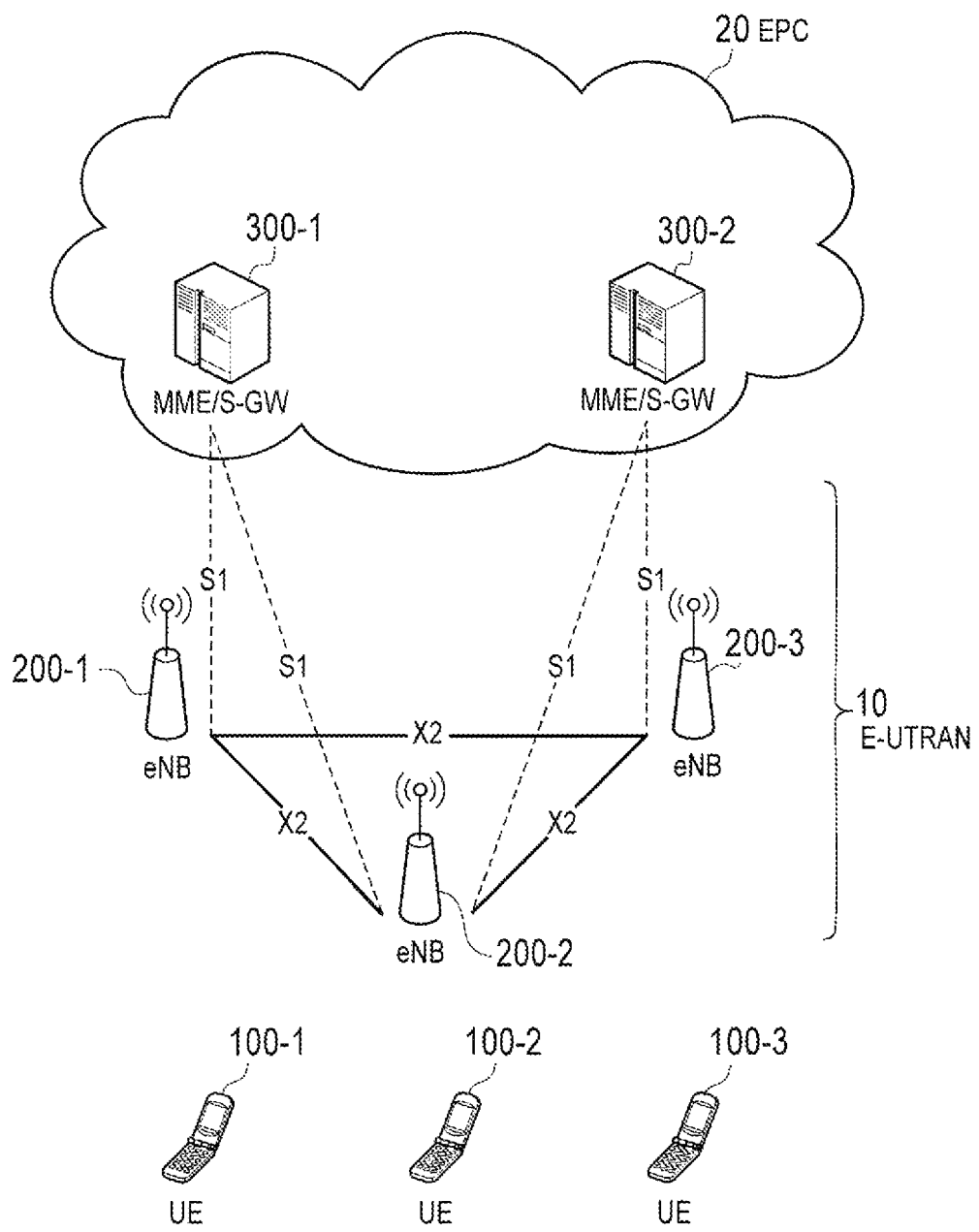
FIG. 1 is a configuration diagram of an LTE system.

A mobile communication system according to an embodiment includes a base station, a first user terminal and a second user terminal that establish a connection with the base station, and a core network that accommodates the base station. The mobile communication system supports cellular communication in which a data path set between the first user terminal and the second user terminal passes through the core network, and D2D communication in which the data path does not pass through the core network. The D2D communication includes a first D2D communication mode in which the data path does not pass through the base station, and a second D2D communication mode in which the data path passes through the base station. When a communication state of the D2D communication in the first D2D communication mode is deteriorated, the first user terminal and the second user terminal make a transition to the second D2D communication mode to transmit non-transmitted data, and then switch the D2D communication to the cellular communication. In this way, before being switched to the cellular communication, it is possible to transmit the non-transmitted data in the second D2D communication mode without discarding the non-transmitted data. Consequently, when the communication state of the D2D communication in the first D2D communication mode is deteriorated, it is possible to seamlessly perform switching from the D2D communication to the cellular communication.

In the embodiment, before the transition from the first D2D communication mode to the second D2D communication mode, at least one of the first user terminal and the second user terminal transmits a transition request to the second D2D communication mode to the base station. In this way, the base station is able to determine whether the transition to the second D2D communication mode is possible.

In the embodiment, in response to the reception of a permission response for the transition request from the base station, the first user terminal and the second user terminal, together with the base station, make the transition from the first D2D communication mode to the second D2D communication mode. In this way, the transition to the second D2D communication mode is made after recognizing that the transition to the second D2D communication mode is possible, so that it is possible to more reliably make the transition to the second D2D communication mode.

In the embodiment, before the switching from the D2D communication to the cellular communication, the first user terminal and the second user terminal transmit a transmission completion notification to the base station in response to the completion of the transmission of the non-transmitted data. In this way, the base station is able to recognize that the transmission of the non-transmitted data has been completed.

In the embodiment, in response to the reception of the transmission completion notification, the base station transmits a data path switching request for switching to the cellular communication to the core network. In this way, the core network is able to determine whether the switching to the cellular communication is possible.

In the embodiment, after the base station receives a permission response for the data path switching request from the core network, the first user terminal and the second user terminal, together with the base station and the core network, switch the D2D communication to the cellular communication. In this way, the D2D communication is switched to the cellular communication after recognizing that the switching to the cellular communication is possible, so that it is possible to more reliably switch the D2D communication to the cellular communication.

A user terminal according to the embodiment establishes a connection with a base station in a mobile communication system. The mobile communication system supports cellular communication in which a data path set between the user terminal and another user terminal passes through the core network and D2D communication in which the data path does not pass through the core network. The D2D communication includes a first D2D communication mode in which the data path does not pass through the base station and a second D2D communication mode in which the data path passes through the base station. The user terminal comprises: a control unit that makes a transition to the second D2D communication mode to transmit non-transmitted data when a communication state of the D2D communication in the first D2D communication mode has been deteriorated and then is switches from the D2D communication to the cellular communication.

A processor according to the embodiment is provided in a user terminal that establishes a connection with a base station in a mobile communication system. The mobile communication system supports cellular communication in which a data path set between the user terminal and another user terminal passes through the core network and D2D communication in which the data path does not pass through the core network. The D2D communication includes a first D2D communication mode in which the data path does not pass through the base station and a second D2D communication mode in which the data path passes through the base station. The processor performs a process in which the user terminal makes a transition to the second D2D communication mode to transmit non-transmitted data when a communication state of the D2D communication in the first D2D communication mode has been deteriorated and then switches from the D2D communication to the cellular communication.

A base station according to the embodiment establishes a connection with a first user terminal and a second user terminal in a mobile communication system. The mobile communication system supports cellular communication in which a data path set between the first user terminal and the second user terminal passes through the core network and D2D communication in which the data path does not pass through the core network. The D2D communication includes a first D2D communication mode in which the data path does not pass through the base station and a second D2D communication mode in which the data path passes through the base station. The base station comprises: a control unit that controls the first user terminal and the second user terminal such that the first user terminal and the second user terminal make a transition to the second D2D communication mode to transmit non-transmitted data when a communication state of the D2D communication in the first D2D communication mode has been deteriorated and then switch the D2D communication to the cellular communication.

A processor according to the embodiment is provided in a base station that establishes a connection with a first user terminal and a second user terminal in a mobile communication system. The mobile communication system supports cellular communication in which a data path set between the first user terminal and the second user terminal passes through the core network and D2D communication in which the data path does not pass through the core network. The D2D communication includes a first D2D communication mode in which the data path does not pass through the base station and a second D2D communication mode in which the data path passes through the base station, The processor performs a process in which the base station controls the first user terminal and the second user terminal such that the first user terminal and the second user terminal make a transition to the second D2D communication mode to transmit non-transmitted data when a communication state of the D2D communication in the first D2D communication mode has been deteriorated and then switch the D2D communication to the cellular communication.

A communication control method according to the embodiment is used in a mobile communication system, which includes a base station, a first user terminal and a second user terminal that establish a connection with the base station, and a core network that accommodates the base station and supports cellular communication in which a data path set between the first user terminal and the second user terminal passes through the core network and D2D communication in which the data path does not pass through the core network. The D2D communication includes a first D2D communication mode in which the data path does not pass through the base station and a second D2D communication mode in which the data path passes through the base station. The communication control method comprises: a step of making, by the first user terminal and the second user terminal, a transition to the second D2D communication mode to transmit non-transmitted data when a communication state of the D2D communication in the first D2D communication mode has been deteriorated and switching from the D2D communication to the cellular communication.

A user terminal according to the embodiment establishes a connection with a base station in a mobile communication system. The mobile communication system supports cellular communication in which a data path set between the user terminal and another user terminal passes through the core network and D2D communication in which the data path does not pass through the core network. The D2D communication includes a first D2D communication mode in which the data path does not pass through the base station and a second D2D communication mode in which the data path passes through the base station. The user terminal comprises: a control unit that makes a transition from the first D2D communication mode to the second D2D communication mode to transmit non-transmitted data and then switches from the D2D communication to the cellular communication.

A base station according to the embodiment establishes a connection with a first user terminal and a second user terminal in a mobile communication system. The mobile communication system supports cellular communication in which a data path set between the first user terminal and the second user terminal passes through the core network and D2D communication in which the data path does not pass through the core network. The D2D communication includes a first D2D communication mode in which the data path does not pass through the base station and a second D2D communication mode in which the data path passes through the base station. The base station comprises: a control unit that controls the first user terminal and the second user terminal such that the first user terminal and the second user terminal make a transition from the first D2D communication to the second D2D communication mode to transmit non-transmitted data and then switch the D2D communication to the cellular communication.

Embodiment

Hereinafter, with reference to the accompanying drawings, description will be provided for an embodiment in which D2D communication is introduced to a mobile communication system (an LTE system) configured based on the 3GPP standards.

(LTE System)

FIG. 1 is a configuration diagram of the LTE system according to the present embodiment.

As illustrated in FIG. 1, the LTE system includes a plurality of UEs (User Equipments) 100, E-UTRAN (Evolved Universal Terrestrial Radio Access Network) 10, and EPC (Evolved Packet Core) 20. The EPC 20 corresponds to a core network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 controls a cell and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes a plurality of MME (Mobility Management Entity)/S-GWs (Serving-Gateways) 300.

The MME is a network node for performing various mobility controls, for example, for the UE 100 and corresponds to a controller. The S-GW is a network node that performs transfer control of user data and corresponds to a mobile switching center. The EPC 20 including the MME/S-GW 300 accommodates the eNB 200.

The eNBs 200 are connected mutually via an X2 interface. Furthermore, the eNB 200 is connected to the MME/S-GW 300 via an S1 interface.

Next, the configurations of the UE 100 and the eNB 200 will be described.

Figure 2:
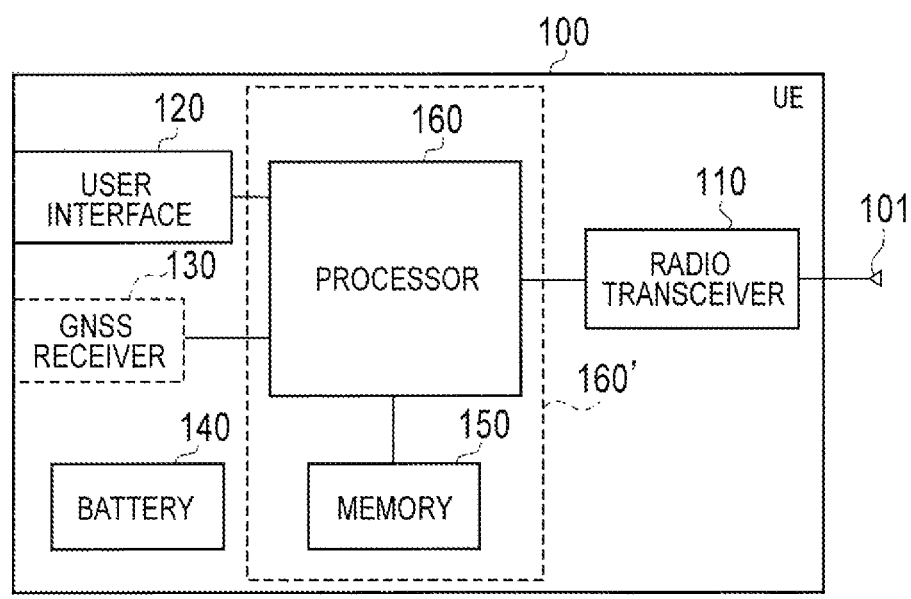
FIG. 2 is a block diagram of UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs coding and decoding of sound and video signals. The processor 160 implements various processes and various communication protocols described later.

Figure 3:
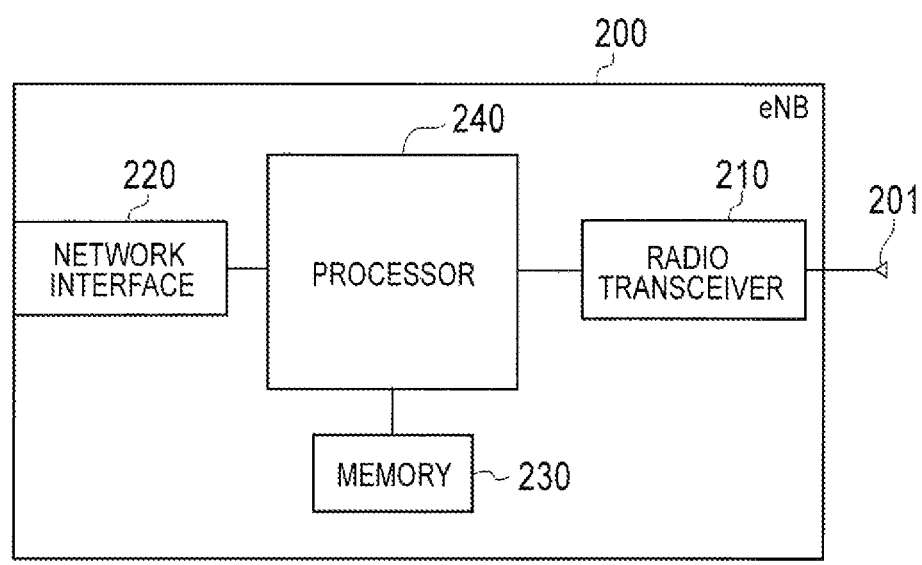
FIG. 3 is a block diagram of eNB.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201.

Furthermore, the radio transceiver 210 converts the radio signal received by the antenna 201 into the baseband signal, and outputs the baseband signal to the processor 240. Furthermore, the memory 230 may be integrally formed with the processor 240, and this set (that is, a chipset) may be called a processor.

The network interface 220 is connected to the neighboring eNB 200 via the X2 interface and is connected to the MME/S-GW 300 via the S1 interface.

The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, encoding and decoding and the like of the baseband signal and a CPU that performs various processes by executing the program stored in the memory 230. The processor 240 implements various processes and various communication protocols described later.

Figure 4:
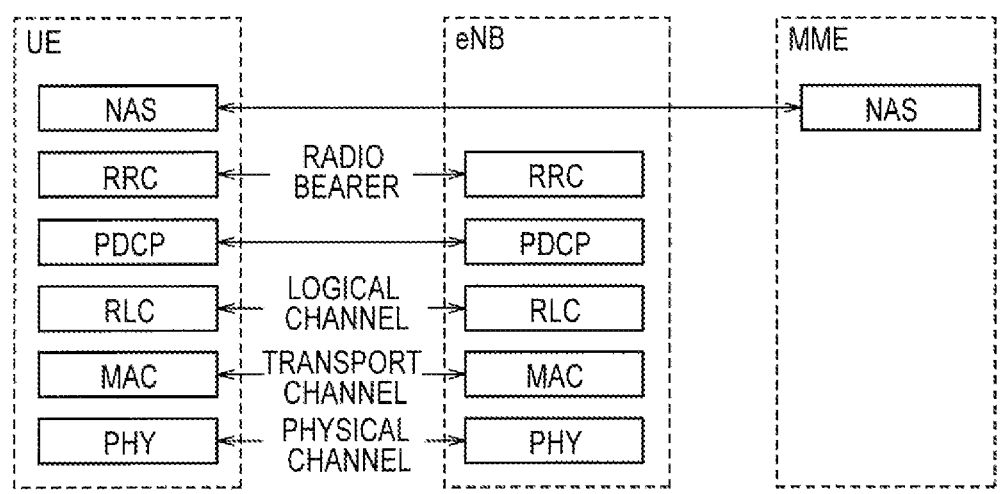
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs preferential control of data, and a retransmission process and the like by hybrid ARQ (an HARQ). Between the MAC layer of the UE 100 and the MAC layer of the eNB 200, data is transmitted via a transport channel. The MAC layer of the eNB 200 includes a MAC scheduler that determines an uplink and downlink transport format (a transport block size, a modulation and coding scheme and the like) and an assignment resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connection state, and when the RRC connection is not established, the UE 100 is in an idle state.

A NAS (Non-Access Stratum) layer positioned above the RRC layer performs session management or mobility management, for example.

Figure 5:
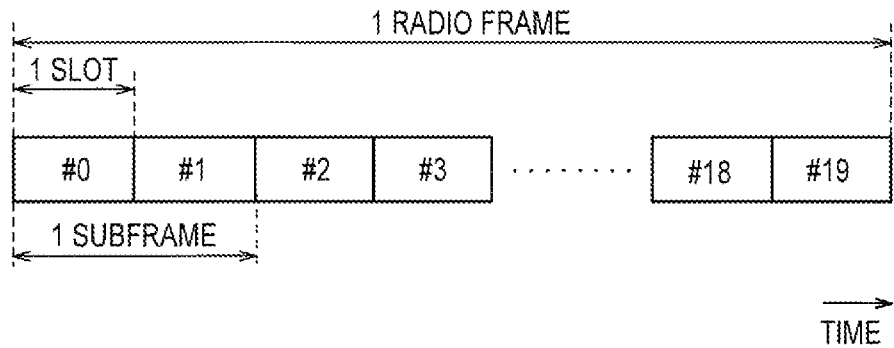
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction.

Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the other interval of each subframe is a region mainly used as a physical downlink shared channel (PDSCH).

In the uplink, both end portions in the frequency direction of each subframe are control regions mainly used as a physical uplink control channel (PUCCH). Furthermore, the center portion, in the frequency direction, of each subframe is a region mainly used as a physical uplink shared channel (PUSCH).

(D2D Communication)

The LTE system according to the present embodiment supports the D2D communication. Hereinafter, the D2D communication will be described in comparison with the normal communication (the cellular communication) of the LTE system.

In the cellular communication, the data path set between UEs passes through the EPC 20. On the other hand, in the D2D communication, the data path set between the UEs does not pass through the EPC 20.

Figure 6:
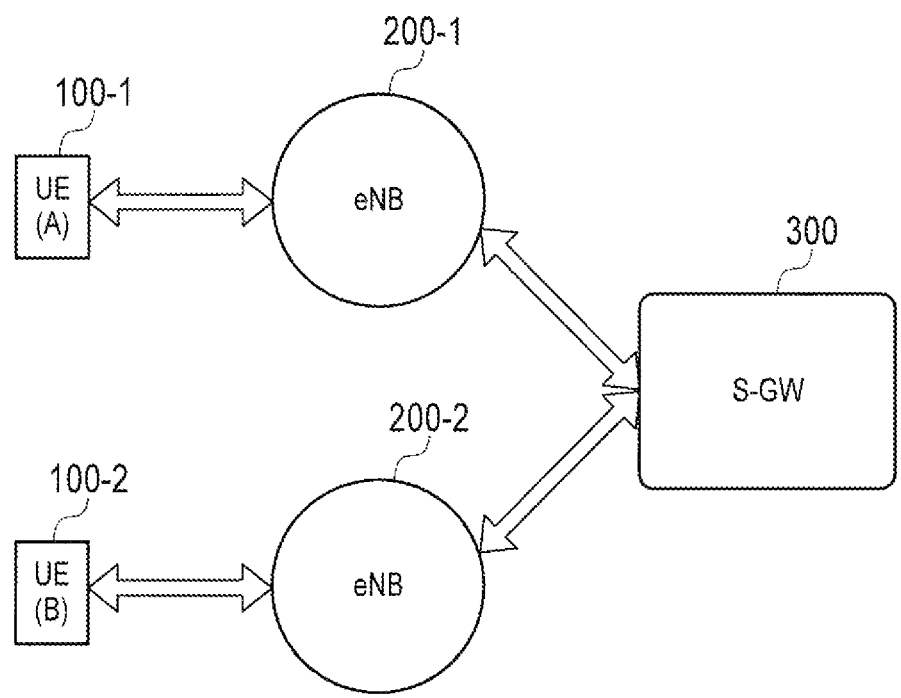
FIG. 6 is a diagram for illustrating a data path in cellular communication.

FIG. 6 illustrates a data path in the cellular communication. In this case, FIG. 6 illustrates the case in which the cellular communication is performed between UE 100-1 that establishes a connection with eNB 200-1 and UE 100-2 that establishes a connection with eNB 200-2. It is noted that the data path indicates a transfer path of user data (a user plane).

As illustrated in FIG. 6, the data path of the cellular communication passes through the EPC 20 (the S-GW 300). Specifically, the data path is set to pass through the eNB 200-1, the S-GW 300, and the eNB 200-2.

Figure 7:
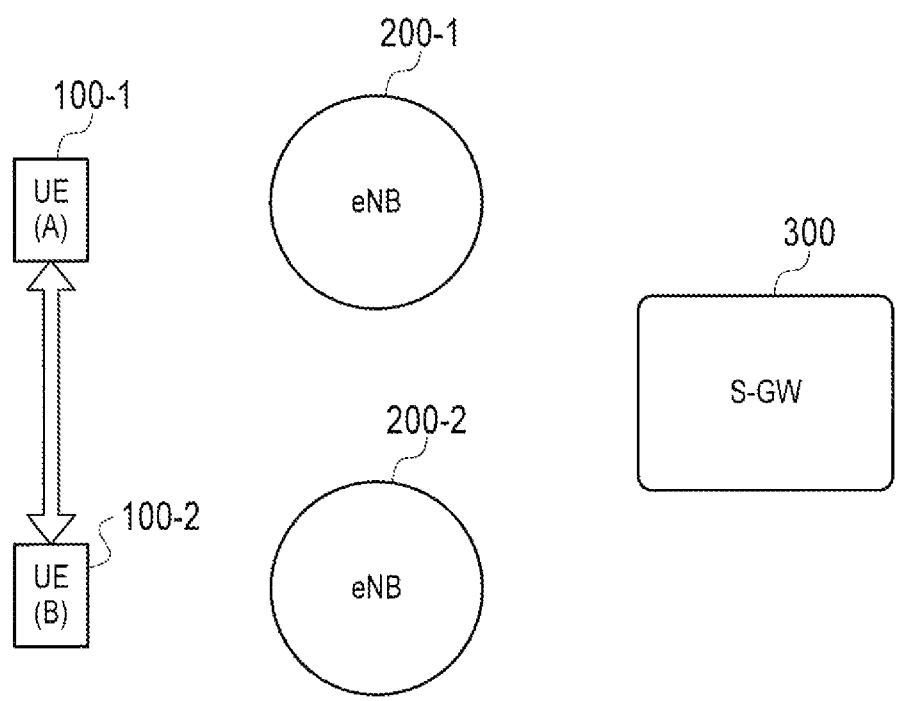
FIG. 7 is a diagram for illustrating a data path in D2D communication.

FIG. 7 illustrates an example of the data path in the D2D communication. In this case, FIG. 7 illustrates the case in which the D2D communication is performed between the UE 100-1 that establishes a connection with the eNB 200-1 and the UE 100-2 that establishes a connection with the eNB 200-2.

As illustrated in FIG. 7, the data path of the D2D communication does not pass through the EPC 20 (the S-GW 300). In the D2D communication, two modes exist. One of them is a direct communication mode (a first D2D communication mode) in which the data path does not pass through the eNB 200. FIG. 7 illustrates a case of the D2D communication in the direct communication mode. The other one of them is a local relay mode (a second D2D communication mode) in which the data path passes through the eNB 200. The local relay mode is also called a Locally Routed (L.R) mode.

As described above, when the UE 100-2 exists in the vicinity of the UE 100-1, the D2D communication is performed between the UE 100-1 and the UE 100-2, thereby obtaining an effect such as the reduction of a traffic load of the EPC 20 and a battery consumption amount of the UE 100.

It is noted that there are a case (a) that the D2D communication starts after a partner terminal is discovered by performing an operation for discovery of the partner terminal and a case (b) that the D2D communication starts without the operation for discovery of a partner terminal, as a case of the D2D communication starting.

In the case (a), for example, one UE 100 of the UE 100-1 and the UE 100-2 discovers the other UE existing in the vicinity of the one UE 100, and then the D2D communication starts.

In this case, the UE 100 has a (Discover) function of discovering the other UE 100 existing in the vicinity of the UE 100 and/or a (Discoverable) function discovered by the other UE 100 to discover the partner terminal.

For example, one UE of the UE 100-1 and the UE 100-2 transmits a signal for discovery (Discover signal) to the vicinity of the one UE, and the other UE receives the signal for discovery, so that the other UE discovers the one UE. Furthermore, the other UE transmits a response signal for the signal for discovery to the vicinity of the other UE and the one UE receives the response signal, so that the one UE discovers the other UE.

Also, it is not necessary for the UE 100 to perform the D2D communication even though the UE 100 discoveries the partner terminal. For example, the UE 100-1 and the UE 100-2 negotiate after the discovery of each other, and then the UE 100-1 and the UE 100-2 determine whether to perform the D2D communication. The D2D communication starts when each of the UE 100-1 and the UE 100-2 agrees with performing the D2D communication.

On the other hand, in the case (b), for example, the UE 100-1 starts informing a signal for the D2D communication by broadcast. Thus, the UE 100 can start the D2D communication regardless of whether to discover the partner terminal.

However, it is considered that the D2D communication is performed in a frequency band (that is, in a frequency band of the cellular communication) of the LTE system, and for example, in order to avoid interference to the cellular communication, the D2D communication is performed under the management of the eNB 200.

Operation According to Embodiment

Hereinafter, an operation according to the present embodiment will be described.

(1) Operation Overview

Figure 8:
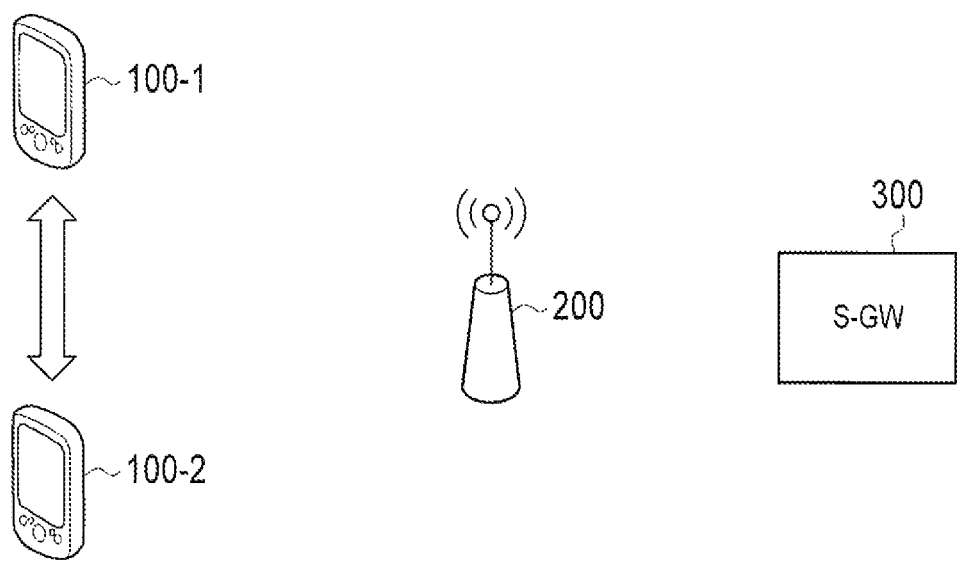
FIG. 8 is a diagram for illustrating a direct communication mode (a first D2D communication mode) in the D2D communication according to an embodiment.

FIG. 8 is a diagram illustrating an operation environment according to the present embodiment.

As illustrated in FIG. 8, the case, in which, in an operation environment having the eNB 200, the UE 100-1 and the UE 100-2 that establish a connection with the eNB 200, and the EPC 20 (the S-GW 300) that accommodates the eNB 200, the UE 100-1 and the UE 100-2 perform the D2D communication in the direct communication mode, is considered.

That is, in an initial state of the operation according to the present embodiment, the UE 100-1 and the UE 100-2 are adjacent to each other and perform the D2D communication in the direct communication mode under the management of the eNB 200.

In the D2D communication, data transmission is performed in a procedure similar to that of the cellular communication. Specifically, the UE 100-1 divides (fragments) a packet addressed to the UE 100-2 and performs a transmission for each data obtained through the division. Furthermore, until the UE 100-1 is notified of ACK from the UE 100-2, the UE 100-1 holds transmitted data corresponding to the ACK. Then, the UE 100-1 retransmits, to the UE 100-2, data for which NACK has been notified from the UE 100-2 or data for which the ACK has been not notified from the UE 100-2. The UE 100-2 also performs data transmission in the same procedure.

Hereinafter, a description will be given on the assumption that the distance between the UE 100-1 and the UE 100-2 becomes long with the movement of at least one of the UE 100-1 and the UE 100-2 and the communication state of the D2D communication in the direct communication mode is deteriorated. The communication state, for example, indicates received power, received SNR, and a reception error rate. The deterioration of the communication state, for example, indicates that the received power or the received SNR is lower than a threshold value, or the reception error rate in the D2D communication is higher than the threshold value.

When the communication state of the D2D communication in the direct communication mode is further deteriorated, since the D2D communication is interrupted, the communication between the UE 100-1 and the UE 100-2 is interrupted. In order to avoid such communication interruption, it is considered to be switched from the D2D communication to the cellular communication by employing the deterioration of the communication state as a trigger.

However, when the D2D communication is suddenly switched to the cellular communication, it is considered that it is difficult to turn over non-transmitted data in the D2D communication to the cellular communication. The "non-transmitted data" indicates at least one of divided (fragmented) data items and data items to be retransmitted.

Furthermore, in the case in which the communication state of the UE 100 is a communication state near the limit in which the D2D communication in the direct communication mode is satisfied, when state transition is repeated between the D2D communication and the cellular communication, unnecessary control information increases, resulting in an increase in the loads of the UE 100 and the EPC 20.

Figure 9:
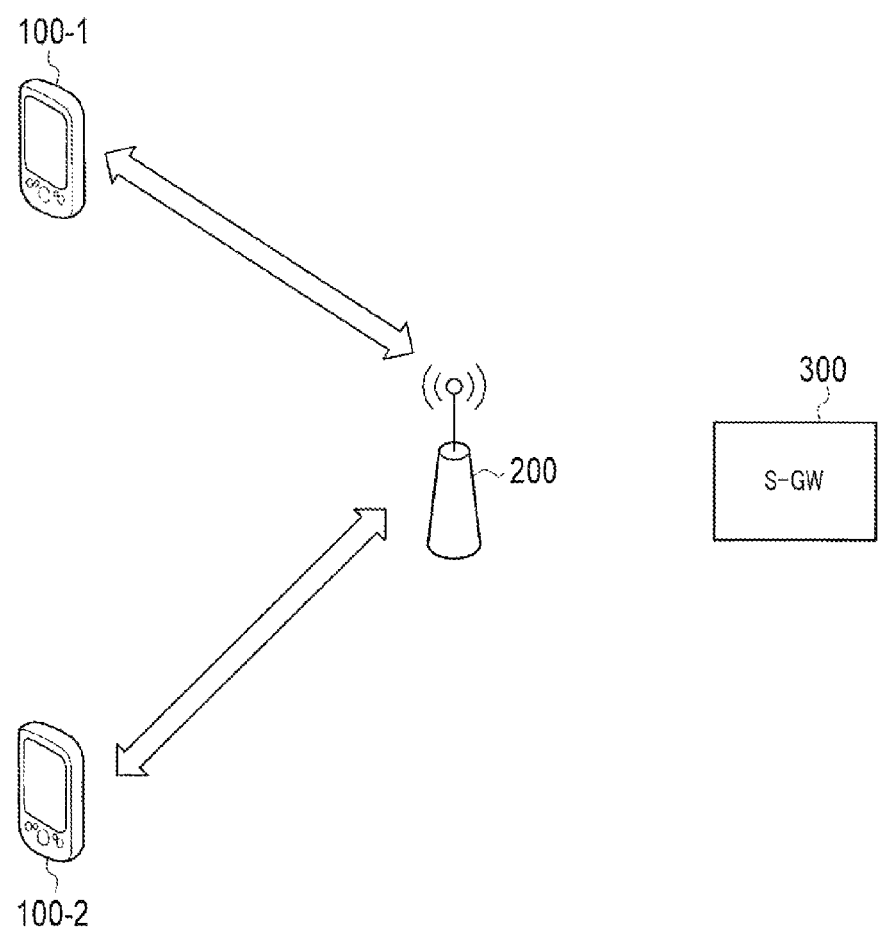
FIG. 9 is diagram for illustrating a local relay mode (a second D2D communication mode) in the D2D communication according to the embodiment.

In this regard, in the present embodiment, as illustrated in FIG. 9, when the communication state of the D2D communication in the direct communication mode is deteriorated, the UE 100-1 and the UE 100-2 make a temporary transition to the local relay mode and then transmit non-transmitted data. Specifically, the UE 100-1 and the UE 100-2 transmit the non-transmitted data in the direct communication mode by using a data path that passes through the eNB 200 and does not pass through the S-GW 300. Furthermore, until the transmission of the non-transmitted data is completed, the UE 100-1 and the UE 100-2 perform the D2D communication in the local relay mode.

Figure 10:
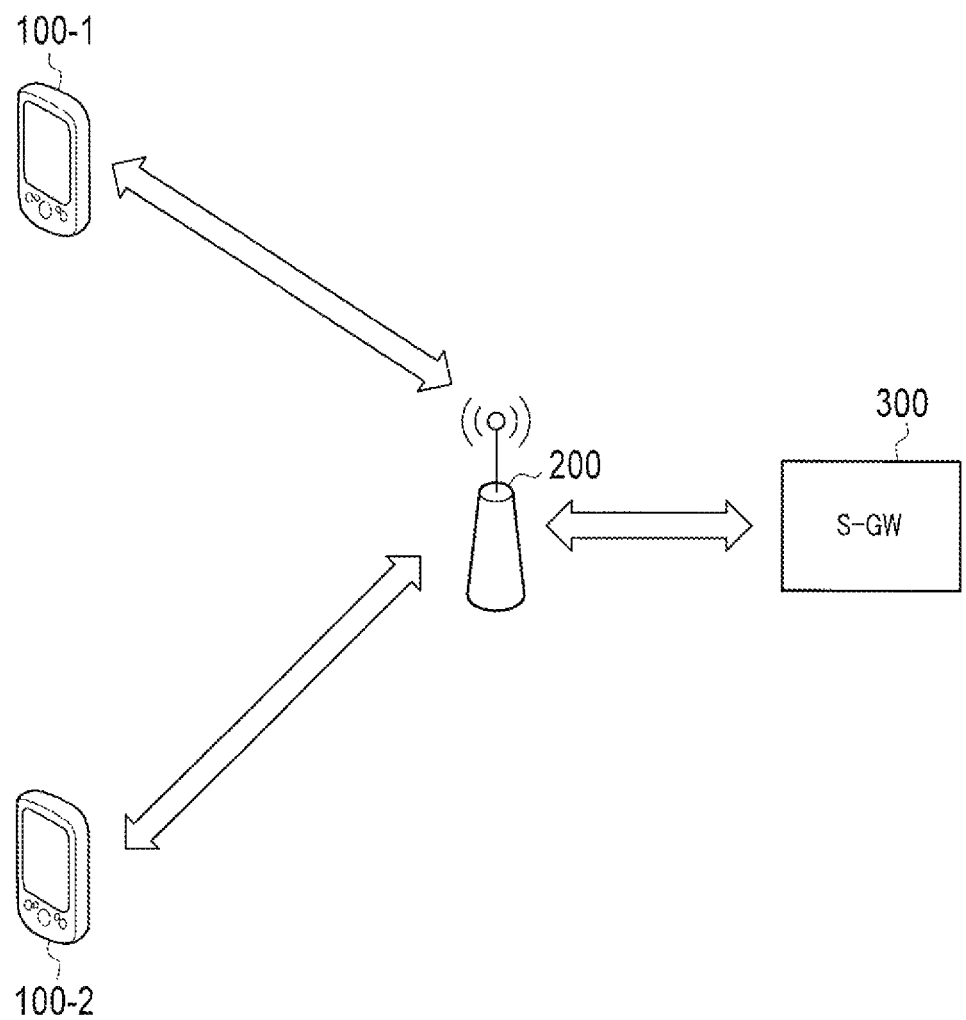
FIG. 10 is a diagram for illustrating cellular communication according to the embodiment.

As illustrated in FIG. 10, when the transmission of the non-transmitted data is completed, the UE 100-1 and the UE 100-2 switch the D2D communication to the cellular communication. Specifically, the UE 100-1 and the UE 100-2 start to transmit new data by using a data path that passes through the eNB 200 and passes through the S-GW 300.

As described above, before being switched to the cellular communication, the UE 100-1 and the UE 100-2 are able to transmit the non-transmitted data in the local relay mode without discarding the non-transmitted data. Consequently, when the communication state of the D2D communication in the direct communication mode is deteriorated, it is possible to seamlessly perform the switching from the D2D communication to the cellular communication.

(2) Operation Sequence

Figure 11:
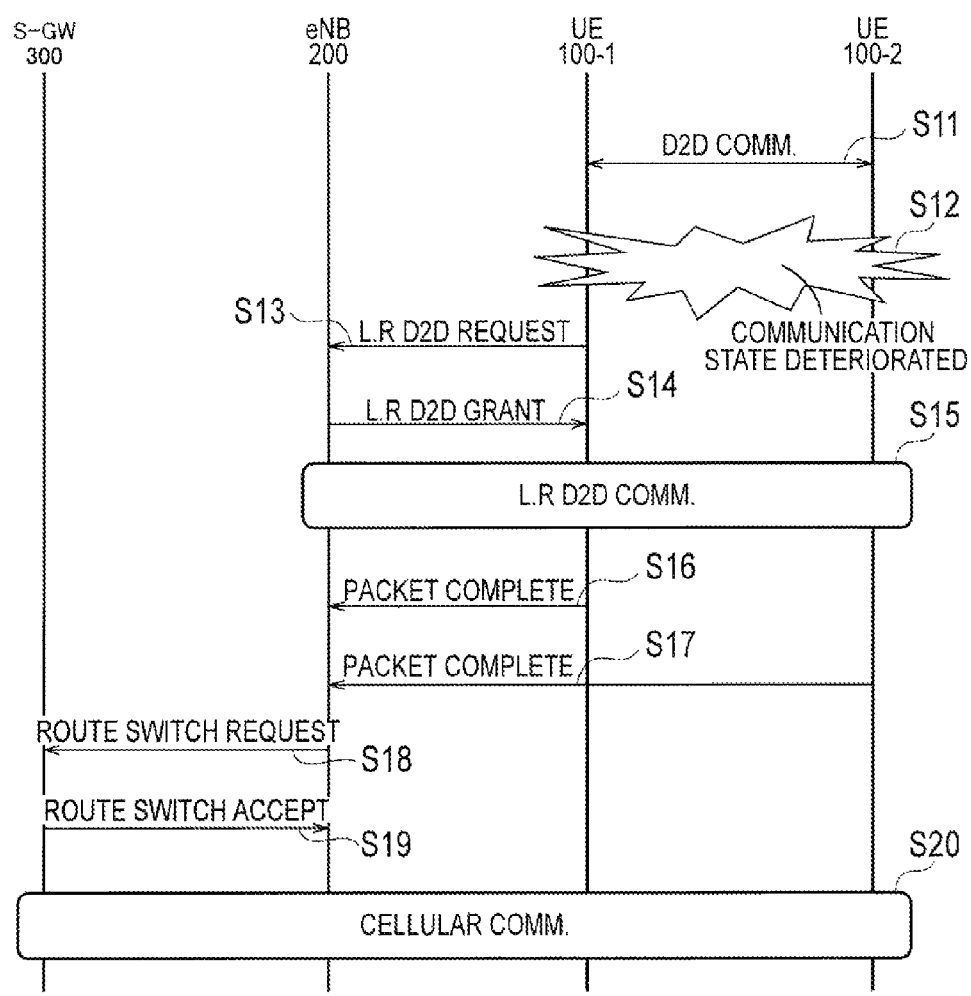
FIG. 11 is a sequence diagram according to the embodiment.

FIG. 11 is a sequence diagram according to the present embodiment.

As illustrated in FIG. 11, in step S11, the UE 100-1 and the UE 100-2 perform the D2D communication in the direct communication mode under the management of the eNB 200.

In step S12, the communication state of the D2D communication in the direct communication mode is deteriorated. For example, received power or received SNR in the D2D communication is lower than a threshold value. Alternatively, a reception error rate in the D2D communication is higher than the threshold value.

In step S13, the UE 100-1 transmits a transition request (L.R D2D request) to the local relay mode to the eNB 200 in response to the detection of the deterioration of the communication state. In addition, when the UE 100-2 also detects the deterioration of the communication state, the UE 100-2 may also transmit the transition request (L.R D2D request) to the local relay mode to the eNB 200.

Based on the transition request received from the UE 100-1, the eNB 200 determines whether transition to the local relay mode is possible. Hereinafter, a description will be given on the assumption that the eNB 200 determined that the transition to the local relay mode is possible.

In step S14, the eNB 200 transmits a permission response (L.R D2D grant) for the transition request to the UE 100-1. In addition, the eNB 200 may transmit the permission response also to the UE 100-2.

In step S15, in response to the reception of the permission response from the eNB 200, the UE 100-1 and the UE 100-2, together with the eNB 200, make a transition from the direct communication mode to the local relay mode. Specifically, the eNB 200, the UE 100-1, and the UE 100-2 set a data path that passes through the eNB 200 and does not pass through S-GW 300, and transmit and receive non-transmitted data by using the data path.

In step S16, in response to the completion of the transmission of the non-transmitted data to the UE 100-2, the UE 100-1 transmits a transmission completion notification (Packet complete) to the eNB 200.

In step S17, in response to the completion of the transmission of the non-transmitted data to the UE 100-1, the UE 100-2 transmits the transmission completion notification (Packet complete) to the eNB 200.

In step S18, in response to the reception of the transmission completion notifications from each of the UE 100-1 and the UE 100-2, the eNB 200 transmits a data path switching request (Route switch request) for switching the data path of the cellular communication to the S-GW 300.

On the basis of the data path switching request, the S-GW 300 determines whether switching to the cellular communication is possible. Hereinafter, a description will be given on the assumption that the S-GW 300 determined that the switching to the cellular communication is possible.

In step S19, the S-GW 300 transmits, to the eNB 200, a permission response (Route switch accept) for the data path switching request from the eNB 200.

In step S20, the eNB 200 receives the permission response from the S-GW 300, and then the UE 100-1 and the UE 100-2, together with the eNB 200 and the S-GW 300, switch the D2D communication to the cellular communication. Specifically, the S-GW 300, the eNB 200, the UE 100-1, and the UE 100-2 set a data path that passes through the eNB 200 and passes through the S-GW 300, and transmit and receive new data by using the data path.

As described above, according to the present embodiment, before the switching to the cellular communication, it is possible to transmit the non-transmitted data in the local relay mode without discarding the non-transmitted data. Consequently, when the communication state of the D2D communication in the direct communication mode is deteriorated, it is possible to seamlessly perform the switching from the D2D communication to the cellular communication. Furthermore, according to the present embodiment, it is possible to suppress an increase in control information and an increase in a load due to the repetition of state transition between the D2D communication and the cellular communication.

Other Embodiments

Thus, the present invention has been described with the embodiments. However, it should not be understood that those descriptions and drawings constituting a part of this disclosure limit the present invention. From this disclosure, a variety of alternate embodiments, examples, and applicable techniques will become apparent to one skilled in the art.

For example, the aforementioned embodiment has described an example in which all non-transmitted data in the local relay mode is transmitted and then the D2D communication is switched to the cellular communication. However, before the transmission of all the non-transmitted data is completed, the switching from the D2D communication to the cellular communication may be started.

In addition, in the aforementioned embodiment, when a communication state of the D2D communication in the direct communication mode has been deteriorated, the switching from the D2D communication to the cellular communication is performed after transmitting the non-transmitted data in the local relay mode; however, the present invention is not limited thereto. For example, in a case wherein the D2D communication is performed when the load of eNB 200 or the core network exceeds a threshold value, the switching to the D2D communication to the cellular communication may be performed in response to a traffic load of a radio section between UEs 100 performing the D2D communication. Specifically, when a traffic load between the UE 100-1 and the UE 100-2 is lower than a threshold value, the switching to the D2D communication from the D2D communication to the cellular communication may be performed after transmitting the non-transmitted data in the local relay mode. In addition, a switching to the direct communication mode may be performed when the traffic load of radio the radio section between the UEs 100 is higher than the threshold value in transmitting the non-transmitted data in the local relay mode.

In the aforementioned embodiment, one example of applying the present invention to the LTE system is described; however, the present invention is not limited to the LTE system, and the present invention may be applied to a communication system other than the LTE system.

In addition, the entire content of U.S. Provisional Application No. 61/718,869 (filed on Oct. 26, 2012) is incorporated in the present specification by reference.

INDUSTRIAL APPLICABILITY

As described above, the mobile communication system, a user terminal, abase station, a processor and a communication control method according to the present invention are able to appropriately control D2D communication, and thus are useful for a mobile communication field.

The invention claimed is:
1. A mobile communication system, comprising:
a base station,
a first user terminal having a connection with the base station,
a second user terminal having a connection with the base station, and a core network accommodating the base station, wherein the mobile communication system supports:
  cellular communication in which a data path set between the first user terminal and the second user terminal passes through the core network, and
  D2D communication in which the data path set between the first user terminal and the second user terminal does not pass through the core network, wherein
the D2D communication includes:
  a first D2D communication mode in which the data path set between the first user terminal and the second user terminal does not pass through the base station, and
  a second D2D communication mode in which the data path set between the first user terminal and the second user terminal passes through the base station, wherein
the first user terminal and the second user terminal are configured to:
  transition to the second D2D communication mode to transmit non-transmitted data in response to a communication state of the D2D communication in the first D2D communication mode being deteriorated, and
  switch the D2D communication to the cellular communication after the transition.

2. The mobile communication system according to claim 1, wherein
  at least one of the first user terminal and the second user terminal transmits, to the base station, a transition request to the second D2D communication mode before the transition from the first D2D communication mode to the second D2D communication mode.

3. The mobile communication system according to claim 2, wherein
  in response to reception, of a permission response for the transition request, from the base station, the first user terminal and the second user terminal, together with the base station, transition from the first D2D communication mode to the second D2D communication mode.

4. The mobile communication system according to claim 1, wherein
  before switching from the D2D communication to the cellular communication, the first user terminal and the second user terminal transmit a transmission completion notification to the base station in response to completion of transmission of the non-transmitted data.

5. The mobile communication system according to claim 4, wherein
  in response to reception of the transmission completion notification, the base station transmits a data path switching request for switching to the cellular communication to the core network.

6. The mobile communication system according to claim 5, wherein,
  after the base station receives a permission response for the data path switching request from the core network, the first user terminal and the second user terminal, together with the base station and the core network, switch from the D2D communication to the cellular communication.

7. A first user terminal having a connection with a base station in a mobile communication system, comprising:
  a processor coupled to a memory, the processor configured to:
    perform cellular communication in which a data path set between the first user terminal and a second user terminal passes through a core network included in the mobile communication system, and
    perform D2D communication in which the data path set between the first user terminal and the second user terminal does not pass through the core network, wherein,
  the D2D communication includes:
    a first D2D communication mode in which the data path set between the first user terminal and the second user terminal does not pass through the base station, and
    a second D2D communication mode in which the data path set between the first user terminal and the second user terminal passes through the base station, wherein
  the processor is further configured to:
    transition to the second D2D communication mode to transmit non-transmitted data in response to a communication state of the D2D communication in the first D2D communication mode being deteriorated and,
    switch from the D2D communication to the cellular communication after the transition.

8. A processor, which is provided in a first user terminal having a connection with a base station in a mobile communication system, wherein
  the processor is configured to:
    perform cellular communication in which a data path set between the user terminal and a second user terminal passes through the core network, and
    perform D2D communication in which the data path set between the first user terminal and the second user terminal does not pass through the core network, wherein
  the D2D communication includes:
    a first D2D communication mode in which the data path set between the first user terminal and the second user terminal does not pass through the base station, and
    a second D2D communication mode in which the data path set between the first user terminal and the second user terminal passes through the base station, wherein
  the processor is further configured to:
    transition to the second D2D communication mode to transmit non-transmitted data in response to a communication state of the D2D communication in the first D2D communication mode being deteriorated and,
    switch from the D2D communication to the cellular communication after the transition.

9. A base station having a connection with a first user terminal and a second user terminal in a mobile communication system, comprising:
  a processor coupled to a memory, the processor configured to:
    perform cellular communication in which a data path set between the first user terminal and the second user terminal passes through a core network included in the mobile communication system, and
    perform D2D communication in which the data path set between the first user terminal and the second user terminal does not pass through the core network, wherein
  the D2D communication includes:

a first D2D communication mode in which the data path set between the first user terminal and the second user terminal does not pass through the base station, and a second D2D communication mode in which the data path set between the first user terminal and the second user terminal passes through the base station, wherein the processor is further configured to:

cause the first user terminal to transition to the second D2D communication mode to transmit non-transmitted data in response to a communication state of the D2D communication in the first D2D communication mode being deteriorated, and cause the first user terminal to switch the D2D communication to the cellular communication after the transition.

10. A processor, which is provided in a base station having a connection with a first user terminal and a second user terminal in a mobile communication system, wherein the processor is configured to:

perform cellular communication in which a data path set between the first user terminal and the second user terminal passes through a core network included in the mobile communication system, and perform D2D communication in which the data path set between the first user terminal and the second user terminal does not pass through the core network, the D2D communication includes:

a first D2D communication mode in which the data path set between the first user terminal and the second user terminal does not pass through the base station, and a second D2D communication mode in which the data path set between the first user terminal and the second user terminal passes through the base station, wherein the processor is further configured to:

cause the first user terminal to transition to the second D2D communication mode to transmit non-transmitted data in response to a communication state of the D2D communication in the first D2D communication mode being deteriorated, and cause the first user terminal to switch the D2D communication to the cellular communication after the transition.

11. A communication control method used in a mobile communication system, wherein the mobile communication system comprises:

a base station, a first user terminal having a connection with the base station, a second user terminal having a connection with the base station, and a core network accommodating the base station, wherein the mobile communication system supports:

cellular communication in which a data path set between the first user terminal and the second user terminal passes through the core network, and D2D communication in which the data path set between the first user terminal and the second user terminal does not pass through the core network, wherein the D2D communication includes:

a first D2D communication mode in which the data path set between the first user terminal and the second user terminal does not pass through the base station, and a second D2D communication mode in which the data path set between the first user terminal and the second user terminal passes through the base station, wherein the communication control method comprises:

transitioning, by the first user terminal and the second user terminal, to the second D2D communication mode to transmit non-transmitted data in response to a communication state of the D2D communication in the first D2D communication mode being deteriorated, and switching from the D2D communication to the cellular communication after the transition.

12. A first user terminal having a connection with a base station in a mobile communication system comprising:

a processor coupled to a memory, the processor is configured to:

perform cellular communication in which a data path set between the first user terminal and a second user terminal passes through a core network included in the mobile communication system, and perform D2D communication in which the data path set between the first user terminal and a second user terminal does not pass through the core network, wherein the D2D communication includes:

a first D2D communication mode in which the data path set between the first user terminal and the second user terminal does not pass through the base station, and a second D2D communication mode in which the data path set between the first user terminal and the second user terminal passes through the base station, wherein the processor is further configured to:

transition from the first D2D communication mode to the second D2D communication mode to transmit non-transmitted data, and switch from the D2D communication to the cellular communication after the transition.

13. A base station having a connection with a first user terminal and a second user terminal in a mobile communication system, comprising:

a processor coupled to a memory, the processor configured to:

perform cellular communication in which a data path set between the first user terminal and the second user terminal passes through a core network included in the mobile communication system, and perform D2D communication in which the data path set between the first user terminal and the second user terminal does not pass through the core network, wherein the D2D communication includes:

a first D2D communication mode in which the data path set between the first user terminal and the second user terminal does not pass through the base station, and a second D2D communication mode in which the data path set between the first user terminal and the second user terminal passes through the base station, wherein the processor is further configured to:

cause the first user terminal to transition from the first D2D communication to the second D2D communication mode to transmit non-transmitted data, and
cause the first user terminal to switch the D2D communication to the cellular communication after the transition.

\* \* \* \* \*